Figure 1:
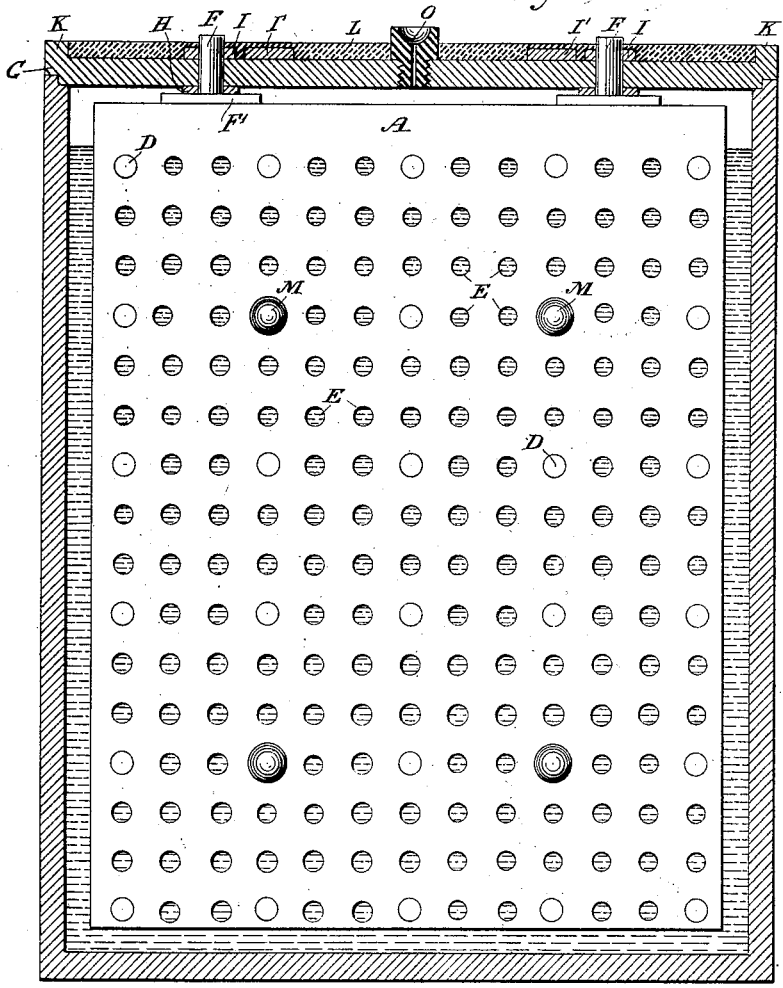

(No Model.) 2 Sheets—Sheet 1.

W. MAIN.
SECONDARY BATTERY.

No. 359,934. Patented Mar. 22, 1887.

Witnesses
Geo. W. Breck.
Carrie E. Ashley.

Inventor
William Main
By his Attorney
M. S. Phelps (No Model.)  2 Sheets—Sheet 2.

W. MAIN.
SECONDARY BATTERY.

No. 359,934.  Patented Mar. 22, 1887.

Witnesses
Geo. W. Breck
Carrie E. Ashley

Inventor
William Main
By his Attorney
M. H. Phelps

N. PETERS, Photo-Lithographer, Washington, D. C.

UNITED STATES PATENT OFFICE.

WILLIAM MAIN, OF BROOKLYN, NEW YORK, ASSIGNOR TO THE RIVER AND RAIL ELECTRIC LIGHT COMPANY, OF WEST VIRGINIA.

SECONDARY BATTERY.

SPECIFICATION forming part of Letters Patent No. 359,934, dated March 22, 1887.

Application filed November 18, 1886. Serial No. 219,303. (No model.)

*To all whom it may concern:*

Be it known that I, WILLIAM MAIN, a citizen of the United States, residing in Brooklyn, county of Kings, and State of New York, have invented a new and useful Improvement in Secondary Batteries, which I desire to protect by Letters Patent of the United States, and of which the following is a specification.

My invention relates to that form of battery which may be used for storing up the energy of an electric current for subsequent redevelopment and use. The simplest battery of that form, as is well known, is that of Planté. To "form" the electrodes for this battery two plates of lead are placed near each other, but not in contact, immersed in an electrolytic bath, and subjected to the action of an electric current passing through them and the bath, the effect of the current being the formation of peroxide of lead on the surface of one plate by the union of oxygen released from the electrolytic fluid with the lead of the plate and the union with or occlusion in the other plate of the liberated hydrogen. Two plates were thus obtained, one of which had a coating of peroxide of lead and the other held a certain amount of hydrogen within its exposed surface, and which as they returned to a condition of mutual equilibrium would exhibit a secondary current, but one which was weak and of short duration. To increase the depth of the active layer on the plates and thus secure a more powerful and enduring battery it was found necessary to reverse the current several times in forming the plates, the reversed current drawing away the oxygen from the former oxygen-plate, (this oxygen uniting with the hydrogen released from the electrolytic fluid to form water,) leaving there a surface of spongy lead and forming peroxide on the former hydrogen-plate. On the second reversal the coating of peroxide was thrown back to the original oxygen-plate, now a plate of spongy lead, and therefore capable of receiving a larger amount of oxygen than before, the oxygen penetrating the plate farther and forming a thicker layer of peroxide. Repetitions of this process increased the depth of the active layers on both plates, and consequently the efficiency of the battery, to a very considerable degree. It was also found that the depth of the layer of peroxide could be increased by employing a succession of currents separated from each other by considerable intervals of time. This was due to the fact that delay permitted the oxygen to penetrate into the plate, lowering the oxidation of the oxygenized layer, but opening up an increased thickness of metal to the action of the next following current. By the use of these methods a battery of some strength could be at length obtained; but its cost was excessive and its operation in some respects unsatisfactory. It was costly because of the mass of lead required to furnish a sufficiently substantial support to the comparatively small active surface, because of the large quantity of electrical energy expended in the several reversals of current, and because of the liability of the layers of peroxide and spongy lead when made so thick to scale off and of the plates themselves to become distorted, to break, or to scale. These latter results were caused by the warping of the plates consequent upon the alternate expansion and contraction of the active layer as the oxygen successively united with it and withdrew from it, these repeated distortions acting upon and in conjunction with irregularities in the structure and form of the plates and other irregularities consequent thereon in the active layers to the injury of both the active and supporting parts. In operation this battery was unsatisfactory for the reason that, in the first place, its internal resistance proved to be too great, especially after the battery had been partially discharged. This was due to the resistance offered by the thick layer of peroxide of lead, which is a poor conductor, especially when partially reduced, and to the large amount of pure water formed in and held within the layer of active material by the process of reduction, pure water being also a poor conductor. It was found to be unsatisfactory for the further reason that when lead plates are freely exposed to the action of an electrolytic fluid containing sulphuric acid considerable quantities of sulphate of lead will be formed in the active layers whenever the battery is allowed to stand inactive. When the active layers are thick, the sulphate so formed is practically cut off from the action of the charging-current when the battery is next used, because of the imperfect conduction of the peroxide between it and the supporting part of the plate, and it results that the battery is permanently clogged and practically disabled, the action of the current upon the plate under the inactive sulphate frequently even causing the oxidized layer to peal off wholly or in part. Thus is explained the well-known liability of batteries of this class to be ruined by standing when discharged with the plates in the liquid.

For the purpose of overcoming these several difficulties and defects various modifications of the original Planté battery have been suggested. Thus it has been proposed to artificially hasten the formation of the electrodes by mechanically attaching an outside layer of lead or other active material to the plates. Red lead so applied to the oxygen-plate is readily converted into peroxide by the union with it of the liberated oxygen, while that attached to the hydrogen-plate is reduced to spongy lead by the union of the liberated hydrogen with its oxygen, forming water; this process being apparently cheaper and quicker than the process of forming the active layers solely by the action of the current upon pure lead plates. The active material used for this purpose has been applied to the plates in two general ways. It has been painted, cemented, or otherwise attached in thin layers to the surface of flat plates, and it has been packed into interstices, holes, spaces between ribs, and other cavities and receptacles of various shapes and arrangement formed in and upon the surface of the plates, or placed in masses between plates riveted or otherwise fastened together. Both methods have disadvantages. The thin layers applied to the surface of the plates, having no intimate union with the lead, readily scaled and dropped off, and it became necessary to devise mechanical means of various sorts—such as retaining-aprons of cloth, wood, or other inactive material—to prevent the active substance from becoming diffused throughout the mass of electrolytic fluid. Even these means, cumbrous, clumsy, and inconvenient as they were, were found to be insufficient unless supplemented by a union between the active material and the plates, effected by a number of reversals of the current in "forming" the plates. The desired advantage of avoiding the use of the large quantities of electrical energy formerly necessary was therefore only partially attained by this means. On the other hand, the method of connecting masses of active material with the plates by packing it in holes and piling it on shelves of various forms was found to be open to most of the disadvantages heretofore enumerated with reference to the thick electrically-formed active layers. The liquid would only penetrate the masses partially and imperfectly, and to the extent to which they were penetrated the conduction of electricity was poor, and therefore the efficiency of the battery relatively small. Sulphate of lead was formed in large quantities whenever the action of the battery was temporarily arrested, and frequently even during the activity of the battery, owing to the practical suspension in places of electrical action, by the non-conducting masses of partially-oxidized lead. Batteries formed on this and all analogous plans, like the original Planté battery, have been practical failures, because they have disregarded the principle that it is only the surface of the plates which is active and efficient to any considerable degree.

It has been proposed to form electrodes of scraps and shavings of lead in order to increase the active surface; but batteries so made have been found to be subject to all the disadvantages arising from imperfect conduction (clogging by sulphate, scaling, and breaking) above enumerated. It has also been proposed to improve the original Planté battery by the use of electrodes made of thin sheets of lead, offering a large active surface in proportion to weight and size, it being apparent that if such a battery could be formed it would be simpler, more readily charged, and stronger and more efficient in proportion to weight, size, and cost than a battery wherein a deep layer of active material is electrically formed by repeated reversals of current, or one in which the active material is mechanically attached to the plates.

It is to this general class of batteries that my invention belongs, it being my purpose to devise a battery on this plan, which I believe to be the best, which shall avoid the difficulties and defects attaching to the Planté battery above enumerated.

Electrodes made of sheet-lead have heretofore been proposed in which it has been thought necessary to separate the sheets by the interposition of various materials, such as paper, parchment, various metallic oxides, powdered coke, sand, powdered glass, graphite, and similar materials. It has also been proposed to separate the plates by corrugating each second plate. It has been proposed to hold these bundles of plates together by the use of parchments or cloth sacks, bands of india-rubber, or other inert material, or by soldering their edges; but these various constructions have been found to avoid the difficulties referred to only to an indifferent extent. Many of the materials used for separating the plates had a chemical effect upon the battery, which was injurious. The electrolytic fluid having free access to the surface of the plates, sulphate of lead was freely formed, with its accompanying disadvantages. There was nothing to prevent the plates from buckling and breaking and the active layers from scaling off. The separating media occupied much valuable space, and a still more serious difficulty was encountered in the inferior conducting capacity of the plates when partially consumed, the layers of peroxide being, as before stated, poor conductors, especially after partial discharge of the battery. Moreover, the means used for retaining the plates together were cumbrous, taking up valuable space, and in no respect aiding the chemical action of the battery. Other serious defects of electrodes so made is the difficulty of keeping the thin plates at all points far enough apart to permit access of the fluid, especially if the plates are made of any considerable size, the liability of the passages between them to become clogged, and the consequent uncertain action of the battery. On the whole, batteries so constructed have had hitherto little stability, strength, or practical value.

In experimenting with a view to constructing a practical battery of this general class I have discovered that it is not advantageous to separate the sheets of lead or lead-foil from each other, but that they may much better be allowed to rest face to face, giving when so used an electrode of greater efficiency relative to size than any heretofore made. I find that with this construction the electrolytic fluid will be drawn up between the plates by capillary attraction in quantities amply sufficient to oxidize them and yield maximum results as regards the storing of energy, it being only necessary to provide passage-ways for the electrolytic fluid by means of holes, slots, or other channels passing through the plates from side to side at sufficiently-frequent intervals. These perforations may be made of any shape whatever if they only permit the liquid to pass freely through them, and should be as numerous as is in practice found desirable for the kind of battery required for the particular use. A battery desired to be quick in its action, readily charged, and intended to give up its charge within a short period of time should have a greater number of perforations in its electrodes than one designed for more sluggish action. It will probably be found best to place the perforations in regular patterns throughout the electrode, in order that the latter may be at all points equally accesible, or as nearly so as practicable, to the action of the electrolytic fluids; but I do not limit myself to such an arrangement, nor to any other in particular.

I propose to provide against the difficulty experienced in the use of electrodes made up of thin plates, in that as the plates are consumed the conduction of the current is not properly provided for, by placing at intervals between the thin plates other plates of sufficient thickness to certainly withstand the action of the current for a considerable length of time, and thereby afford a reliable channel for the passage of the current to and from the active surfaces. I also propose to increase the activity of the thin surface and promote the activity of the thin sheets by puncturing or perforating them, passing them under pressure between sheets of sand-paper or between rollers especially designed for that purpose, or effecting the puncturing by other suitable means. The cavities or holes so formed in the sheets may or may not pass entirely through them. The activity and sensitiveness of the electrodes is materially increased by this treatment, for the reason that points are thus provided at which the chemical action on the plates will begin more readily than on a smooth surface. The roughening, moreover, increases the absolute surface area of the plate, and also increases the strength of the capillary action. Its function is wholly different from that of the recesses provided in inactive supporting-plates for receiving and retaining active material. I propose to attach the plates to each other by rivets of the same material as the plates, this construction dispensing with the use in the battery of every material whatever which is not chemically effective, though I do not limit myself to the use of such material for rivets. The plates may be riveted together before they have been subjected to any electrolytic action; but I find that time is saved in charging the battery if they are first oxidized. Likewise, the perforations may be made in the electrodes either before or after they are joined together, and if the plates are oxidized before being joined, either before or after they are so treated.

Electrodes formed as above described entirely avoid the difficulties heretofore experienced arising from the formation of sulphate of lead while the battery is in action. The surface area is so great that the layer of active material nowhere penetrates the body of the metal, and therefore the sulphate—even that formed on the outer surfaces of the electrodes—can never become electrically detached from the conducting portion of the electrodes, so as to escape reduction by the next charging-current. This battery has therefore the great advantage over other practical batteries that it may be allowed to stand with the plates in the liquid, charged or discharged, without suffering any permanent injury.

I wish it understood that the use of rivets to bind the plates together, the puncturing of the thin plates, and the interposition at intervals of comparatively thick plates are features of my construction which may or may not be employed, the gist of the invention consisting in the making of an electrode of a number of superimposed laminæ of suitable metal provided with channel-ways through them for the flow of the electrolytic fluid, and its great advantage lying in the fact that an electrode so made combines enormous surface area with solidity and compactness of a heavy plate-electrode.

I do not limit my invention to the use of lead plates. Any other suitable material may be used, and, if made up into electrodes in a similar way, the battery so formed will be within my invention.

In addition to the improvements above described, my invention includes certain details in the construction of a secondary battery-cell, hereinafter fully described, and pointed out in the claims.

Figure 3:
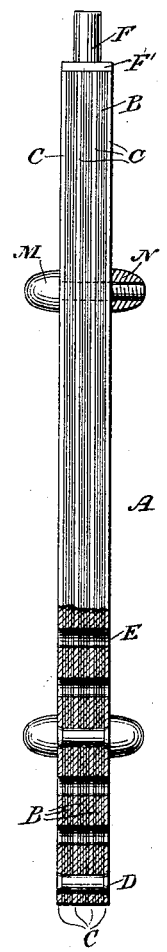
Figure 2:
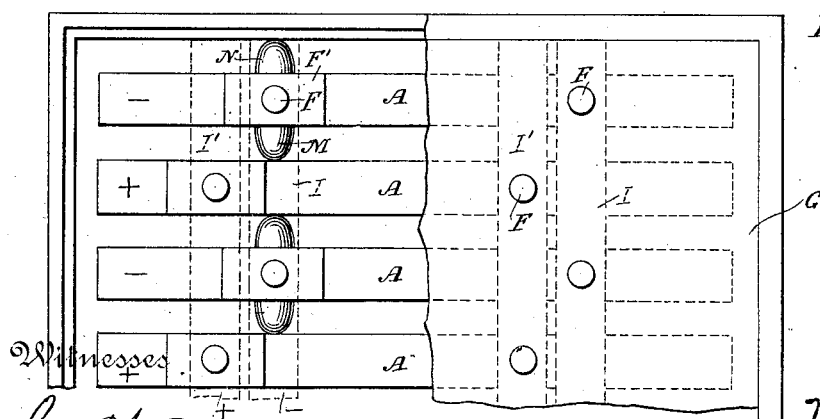
Figure 4:
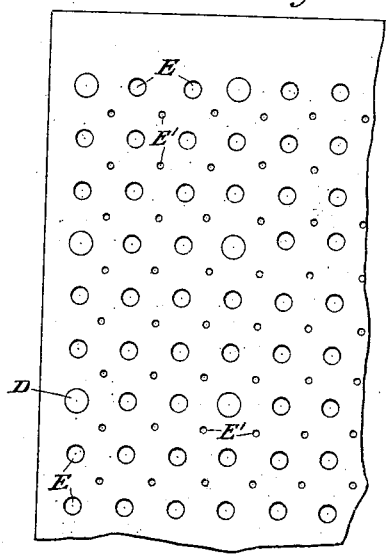
Figure 5:
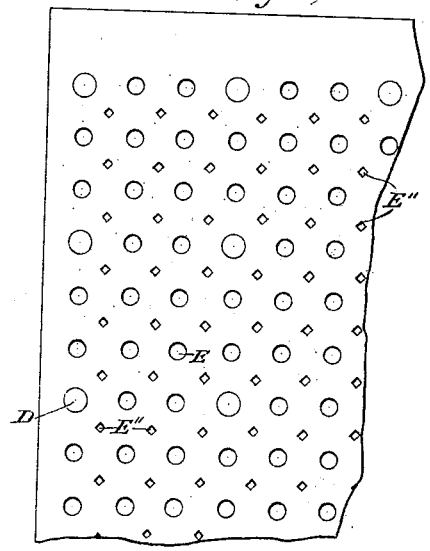
Figure 6:
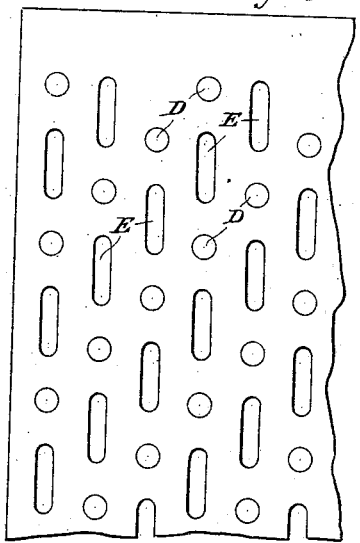
Figure 7:
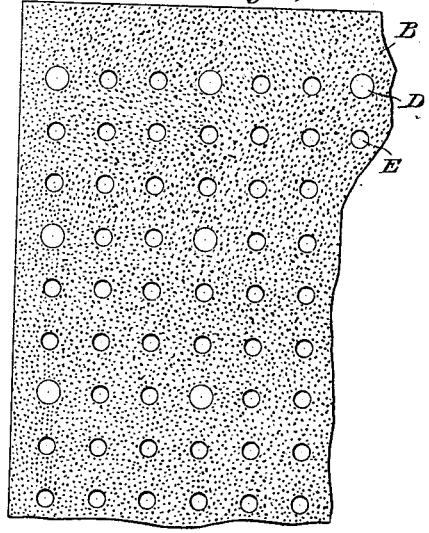

In the drawings annexed hereto and forming a part of this specification, Figure 1 is a vertical sectional view of a secondary battery-cell, showing in elevation an electrode made according to my invention. Fig. 2 is a plan view of a cell of which a part of the top has been broken away to show the edges of the electrodes or plates. Fig. 3 is an edge view of one of the plates, the lower part being shown in cross-section. Figs. 4, 5, and 6 represent modifications in the shape and arrangement of the channels through the plates from side to side; and Fig. 7 is a side view of the surface of one of the plates, showing the roughened or punctured surface.

The electrodes A are made up of a number of thin sheets of lead, platinum, or other suitable metal, B, between which at intervals are heavier plates or sheets of conducting metal, C, these sheets being placed face to face and united to each other by rivets D, a suitable number of which are used to hold the sheets firmly and durably together. The electrodes or plates thus made up are provided with a large number of perforations or channel-ways, E, cut through them from side to side. These channel-ways may be made round, as shown in Figs. 1, 4, and 5, oblong, as some of them are shown in Fig. 6, or of any other form desired, it being only necessary to provide passage-ways through which the electrolytic fluid may have free access to all the plates at a large number of points. I have found it convenient to vary the size of the channel-ways, as shown in Figs. 4 and 5, placing small perforations at intermediate points between larger ones, as at E' and E''. These small perforations I find are sufficient to furnish starting-points for the penetration of the fluid between the plates. I prefer to roughen or puncture all the interior surfaces of the plates, as shown in Fig. 7, and I may also similarly prepare the two outside surfaces.

The heavier plates, C, if made of metal which is not subject to electrolytic action, may be as light and thin as desired, it being only necessary that they should furnish a certain and permanent conducting-path for the current to the active surfaces. I consider it best to make them of active material, as this gives, of course, so much more active surface in the electrode; but when so made it is necessary that they should be heavier than the other plates, in order that there may certainly be a proper conducting-path for the current as long as the electrode lasts. To the top edge of each compound plate are soldered two projecting lugs, F, provided with base-pieces F', these lugs serving to suspend the plates in the cell and furnishing the means for making electrical connection therewith. These lugs project up through holes made for them in the cover G of the battery-cell, washers H, preferably of asbestus soaked in paraffine, being placed between the base-pieces F and the cover G, this cover being made of hard rubber or similar material.

The electrodes A are of course arranged in positive and negative pairs, as shown, and the lugs of the positive and negative electrodes, respectively, are arranged in separate transverse ranges, as shown in Fig. 2, so that the lugs of the same pole may be conveniently connected to each other by the strips I and I', fitted over the projecting ends of the lugs and lying against the top of the cover. The lugs F and the strips I and I' having been placed in this relative position are soldered together, whereby the plates A are solidly and firmly attached to the cover.

In order to prevent the insulation of the connections from being impaired by the accumulation of dirt, and to thoroughly protect them, I make the cover G with an upwardly-projecting flange, K, about its edge; and after the various parts have been put in place, as described, I fill the basin formed by this flange with melted pitch or similar insulating material, which, when it hardens, forms an effectual protecting-layer, L. Circuit-connections are made with the projecting points of the lugs F in any convenient manner.

For the purpose of separating the electrodes, instead of using the usual transverse or vertical rods, which are objectionable in that they rest against a considerable portion of the active surface of the plates, to that extent diminishing their efficiency, and also because they furnish supports and lodging places for the accumulation of various kinds of sediment and dirt, which more or less interferes with the insulation of the plates from each other, I have devised a round-headed bolt, M, a suitable number of which are set into each second plate and effectually prevent the plates from coming together. These bolts are made of hard rubber or other insulating material, and are each provided with a nut, N, shaped like their heads. Heads and nuts of this shape are desirable, because they impinge upon the least possible amount of surface of the adjoining plate, and therefore afford the least possible supporting area for the accumulation of sediment. It is obvious that the shaft of the bolt may be made of metal, provided the heads and nuts are of insulating material. Various modifications in the way of studs and bolts set perpendicularly into the plates for the purpose of separating them might be readily suggested.

I wish it understood that I consider all forms of separating devices set in the plates perpendicular thereto, as distinguished from rods passing from side to side or from top to bottom of the cell, as within my invention. A pointed or wedge shape for the head and nut of the bolt would be an obvious equivalent of the round shape, the important point being that the end of the bolt should have a small surface for contact with the adjoining plate.

The usual plug, O, is provided in the cover, through which the supply of electrolytic fluid may be replenished, and having through its center a ventilating air-passage.

While the lugs F have been shown as being round, it is obvious that they may equally well be of rectangular or other shape, and also that they may be attached in any other way, as well as soldered to the strips I; or other means than attachment to strips might easily be devised for holding the lugs in the cover.

I wish it understood that I claim the various details of construction described for making electrical connection with the plates in their application to batteries of all kinds, as well as in connection with secondary batteries.

What I claim is—

1. An electrode for secondary batteries, made up of thin sheets of lead, platinum, or other suitable material, placed face to face in close contact, and provided with transverse channels or perforations for the passage of the electrolytic fluid.

2. An electrode for secondary batteries, made up of thin sheets of lead, platinum, or other suitable material, riveted together face to face in close contact, and provided with transverse channels or perforations for the electrolytic fluid.

3. An electrode for secondary batteries, made up of thin sheets of lead, platinum, or other suitable material, together with one or more supporting and conducting metal plates placed face to face in close contact, and provided with transverse channels or perforations for the electrolytic fluid.

4. An electrode for secondary batteries, made up of thin sheets of lead, platinum, or other suitable material, together with one or more plates of thicker lead placed face to face in close contact, and provided with transverse channels or perforations for the electrolytic fluid.

5. An electrode for secondary batteries, made up of superficially-oxidized thin sheets of lead or other suitable material, placed in close contact face to face, and provided with transverse channels or perforations for the electrolytic fluid.

6. An electrode for secondary batteries, made up of punctured or roughened sheets of thin lead, platinum, or other suitable material, placed face to face in close contact, and connected together to form a compact mass, the entire mass being provided at frequent intervals with transverse channels for the electrolytic fluid.

7. An electrode for secondary batteries, made up of punctured or perforated sheets of thin lead, platinum, or other suitable material, together with one or more supporting-plates, all placed face to face in close contact, united by lead rivets, and provided with transverse channels at frequent intervals for the electrolytic fluid.

8. An electrode for secondary batteries, made up of thin sheets of lead or other suitable material the surfaces whereof have been artificially roughened, together with one or more heavier supporting-plates, such sheets and plates being placed face to face in close contact and provided with transverse channels or perforations for the passage of the electrolytic fluid.

9. A stud or projection fixed to the face of the battery-plate, having a rounding or pointed end and adapted to prevent electrical contact between adjoining plates.

10. A top for a battery-cell, provided with an upwardly-projecting flange, in combination with electrical connecting-pieces passing through the cover to the battery-plates, and a filling of insulating material in the cavity formed by the cover and said flange.

11. The combination of the plates A, the lugs F, in electrical connection therewith, and the strips I I' and protecting-layer L, substantially as and for the purpose set forth.

12. In a battery, the combination of a plate, lugs attached thereto, a cell-cover through which the lugs project, strips attached to the lugs, and a protecting layer of plastic material, substantially as and for the purpose set forth.

WILLIAM MAIN.

Witnesses:
F. F. RANDOLPH,
M. H. PHELPS.